United States Patent
Dressler

[11] Patent Number: 6,083,616
[45] Date of Patent: Jul. 4, 2000

[54] NONTACK PRESSURE ACTIVATED ADHESIVE

[75] Inventor: Donald R. Dressler, Glastonbury, Conn.

[73] Assignee: Seal Products, Inc., Naugatuck, Conn.

[21] Appl. No.: 08/933,586

[22] Filed: Sep. 19, 1997

[51] Int. Cl.[7] ............................. A61F 13/58; A61F 13/60; B32B 5/16
[52] U.S. Cl. ................. 428/323; 428/343; 428/355 RA; 428/40.1; 428/906; 428/914; 428/355 AC
[58] Field of Search ............................. 428/343, 355 RA, 428/40.1, 323, 906, 914, 355 AC

[56] References Cited

U.S. PATENT DOCUMENTS

| | | | |
|---|---|---|---|
| 3,146,799 | 9/1964 | Fekete | 138/125 |
| 3,301,741 | 1/1967 | Henrickson et al. | 161/119 |
| 3,331,729 | 7/1967 | Danielson et al. | 428/355 RA |
| 3,554,835 | 1/1971 | Morgan | 156/234 |
| 4,054,697 | 10/1977 | Reed et al. | 428/40 |
| 4,150,187 | 4/1979 | Brown | 428/144 |
| 4,556,595 | 12/1985 | Ochi | 428/143 |
| 5,141,790 | 8/1992 | Calhoun et al. | 428/40 |

FOREIGN PATENT DOCUMENTS

| 1511060 | 10/1975 | United Kingdom | B32B 3/30 |
|---|---|---|---|
| WO 96/41604 | 12/1996 | WIPO | A61F 13/58 |

OTHER PUBLICATIONS

"Positionable Mounting Adhesive No. 568" leaflet (Instructions for use with 3M Plastic Squeegee) 3M Commercial Office Supply Division—2 pages. No Date Given.
PCT International Search Report. 3pp.

Primary Examiner—Mark Kopec
Assistant Examiner—Brian P. Mruk
Attorney, Agent, or Firm—Alix, Yale & Ristas, LLP

[57] ABSTRACT

An adhesive coating or layer has a differential height barrier structure deposited on the surface of one or both sides. Consequently, a highly aggressive adhesive formulation can be temporarily neutralized so as not to resist sliding of an item being positioned on the surface, until pressure is deliberately applied. Conversely, the adhesive system can be carried by decorative sheet material for easy application of the sheet material to cover a wall or floor, whereby the sheet can be slid into exact position without "sticking", before permanent adhesion. The present invention may be implemented by forming an array of discrete surface barrier structures which cover 10–30% of the active surface area of the adhesive. The barrier is preferably formed by an array of minute units of hard material or other discrete structures distributed on the adhesive surface and projecting therefrom by about 0.00025–0.0005 inch.

17 Claims, 3 Drawing Sheets

NONTACK PRESSURE ACTIVATED ADHESIVE

BACKGROUND OF THE INVENTION

The present invention relates to pressure sensitive adhesives, and more particularly to adhesives used in the graphics industry.

Pressure sensitive adhesives for the graphics industry are usually coated on one side or two sides of a substrate. The substrate can be a thin film (e.g., "tape") coated on either one or both sides, or a board (e.g., paper, plastic, or foam) coated on one side to be used for mounting. One might adhere an art poster to a board prior to framing or use a double adhesive sided tape to make a display of pictures or articles where the two sided tape is hidden between the two objects being held together. Alternatively, the tape can already be adhered on one of the substrate, with a release liner, so the release liner can be peeled away to expose a tacky pressure sensitive adhesive. A two-sided tape can be provided in a small one-half inch by three yard roll, on a dispenser, for the user to roll off small strips, place them on the back of an item, then adhere the item to another substrate. The item could be pressure sensitive wallpaper or vinyl letters for a boat name or identification number.

Both skilled as well as unskilled users of conventional pressure sensitive adhesives have been victim to sticking down a misaligned item, due to prematurely letting go of it. Even after correct placement, the user must "smooth out" the item. The further skill of achieving an acceptable bubble-free and wrinkle-free lamination is very difficult to perfect, especially for the novice. For this very reason, a product that is non-tacky until heated was developed for a number of applications. This heat activated adhesive is used extensively in the framing industry (dry mount adhesive). A significant source and amount of heat (a heat press) is used to press and heat the substrate until the adhesive melts 160 F–250 F and bonds the substrate to the item.

Heat activated adhesives have a number of drawbacks. All substrates will curl to some extent when heat and pressure are applied. The danger of burns is ever-present. The cost of electricity and fairly long production time to heat up and cool down bonded substrate are clear disadvantages. Once an adhesive becomes a liquid or soft enough to flow and effect a bond, there is a risk it will change the visual appearance of a paper or poster due to melt-through or paper/plastic transmission variables. Many applications simply are not practical for heat activated adhesives. Universal adhesion to, e.g., plastic, paper, metal, and fabric with a single adhesive is very difficult to achieve. Due to this limitation the industry has responded with many heat activated products based on polyester, polyolefins, nylons, and polyurethane, etc. Each such adhesive has its unique application temperature, melt parameters, and substrate suitability.

Certainly conventional pressure sensitive adhesive have a convenience advantage over heat activated adhesives, but the previously stated problems with such pressure sensitive adhesives, limits their appeal to users having a high level of skill in application, or a high frustration tolerance.

Some industries have developed specific products to deal with such pressure sensitive application problems. The sign industry uses large quantities of pressure sensitive vinyl, and markets an auxiliary product called "application fluid". This is essentially a slippery fluid wiped or sprayed on the tacky adhesive side of the vinyl so one can temporarily make the adhesive non-tacky for ease of placement and creation of fewer air bubbles. This fluid is a messy solution for use on non-porous substrate. Other companies have addressed the drawbacks of pressure sensitive adhesives by cutting the tack and/or peel values of the adhesives. This can be accomplished in a number of ways, such as by including additives like waxes, lubricants, and silicone. Another approach is to include fillers and particulates (e.g., microspheres) in the adhesive coating to roughen up the surface of the adhesive, thereby cutting down on initial surface contact area. It is easily appreciated that most pressure sensitive adhesive applications call for permanent, reliable bonding. The techniques for achieving less tack are unreliable and the effectiveness of the coating is unpredictable batch to batch, due to variations in coating parameters, such as oven temperature, humidity, raw materials, etc. Above all, it must be noted that in general the lower the initial tack, the lower the chances for high permanent bonding.

SUMMARY OF THE INVENTION

It is an object of the present invention to effect permanent and reliable pressure sensitive adhesive bonding of one substrate to another using a novel pressure activated adhesive system which is initially non-tacky.

It is another object of the invention to provide a method of producing a pressure activated adhesive system which is initially non-tacky and which can ultimately be used on graphics sheet material, as well as in a tape or on a framing board.

According to the invention, an adhesive coating or layer has a differential height barrier structure deposited on the surface of one or both sides. Consequently, a highly aggressive adhesive formulation can be temporarily neutralized so as not to resist sliding of an item being positioned on the surface, until pressure is deliberately applied. Conversely, the adhesive system can be carried by decorative sheet material for easy application of the sheet material to cover a wall or floor, whereby the sheet can be slid into exact position without "sticking", before permanent adhesion.

The present invention may be implemented by forming an array of discrete surface barrier structures which cover 10–30% of the active surface area of the adhesive. The barrier is preferably formed by an array of hard, discrete structures distributed on the adhesive surface and projecting therefrom by about 0.00025–0.0005 inch. The present invention relies on the substrate to be bonded (the item without adhesive) never coming into contact with the actual adhesive until pressure is applied either manually, by vacuum, or by mechanical press. When pressure is applied, the barrier pattern no longer keeps the adhesive from contacting the item. The adhesive wets out and bonds in seconds (an unexpectedly short period of time). Air entrapment and bubbles are insignificant due to the escape of air around and between the barrier pattern. This achieves smooth adhesion.

The present invention is different from the "repositionable" or "controlled-tack" products which are commercially available. The present invention allows for sliding the item to be mounted into position as if no adhesive were present on the mounting substrate. In the embodiment wherein a decorative sheet carries the adhesive system of the invention, the sheet is the item to be positioned without tackiness. After the item has been correctly positioned, it is secured by pressing down with a finger to tack the item in place. Permanent full-surface bonding can be effected by pressure alone.

BRIEF DESCRIPTION OF THE DRAWINGS

These and other objects and advantages of the invention will be more evident upon reading the following description of the preferred embodiment with reference to the accompanying drawings, in which.

DESCRIPTION OF THE PREFERRED EMBODIMENT

Figure 1:
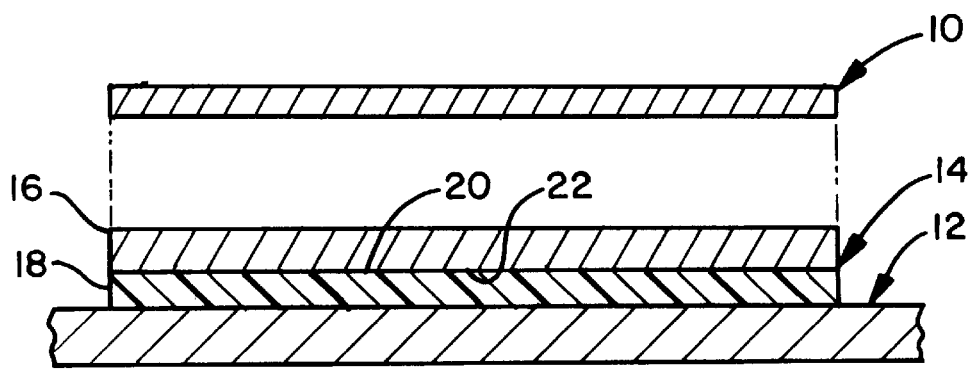
FIG. 1 is a schematic view partly in section, of a mounting substrate which carries an adhesive system by which an item such as a photograph can be secured to the substrate.

FIGS. 1–5 illustrate one embodiment of the present invention, whereby a graphic item such as a photograph 10 or the like, can be bonded to a framing board or similar mounting substrate 12, by use of a pressure activated adhesive system 14. In the illustrated embodiment, the board 12 has a relatively large surface area onto which the smaller photograph 10 is to be precisely aligned and secured. In this embodiment, the adhesive system 14 has first been bonded to the substrate 12, and the adhesive system has the same or preferably smaller area as the photograph 10.

The adhesive system of this embodiment consists essentially of a release liner in the form of a transfer sheet 16 which serves as a carrier for the adhesive layer 18. In a commercial context, the user would typically have a roll of tape composed of the two layer adhesive system 14. A suitable length of tape would be unrolled, cut, and secured on the substrate 12, with tacky adhesive side down. Alternatively, one side of a double sided non-tacky tape according to the invention could be exposed by removing its release liner, positioning the tape on the substrate and then securing it against substrate 12 to arrive at the configuration shown in FIG. 1.

In other embodiments, the substrate 12 could be purchased with the adhesive system 14 already in place thereon, covering either all or a pre-defined portion of the entire area of the substrate 12. In this embodiment, the adhesive system 14 would have been laminated to substrate 12.

Figure 2:
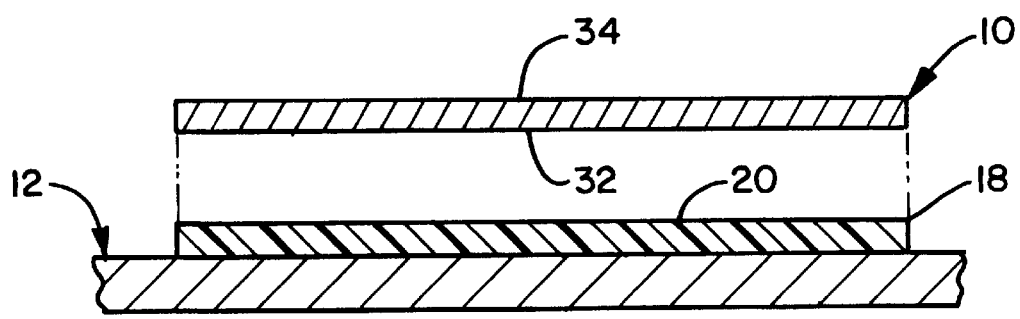
FIG. 2 is a schematic view similar to FIG. 1, after the release sheet has been removed from the adhesive system, thereby exposing the adhesive layer for receiving the photograph.

As shown in FIG. 2, the user peels away the release sheet or layer 16 on the side of the adhesive liner opposite substrate 12, to expose the adhesive surface 20 of adhesive layer 18. Of course, the adhesion between layer 18 and substrate 12 is significantly greater than the adhesion between surface 20 of layer 18 and surface 22 of the release sheet 16. Preferably, release sheet 16 is a polyester or other dimensionally stable film having a preferred thickness in the range of about 2.0 to 5.0 mils. A more important characteristic, however, is that upon removal of the release sheet 16, the exposed adhesive surface 20 of the adhesive layer 18, exhibits certain key features as shown in FIG. 3.

Figure 3:
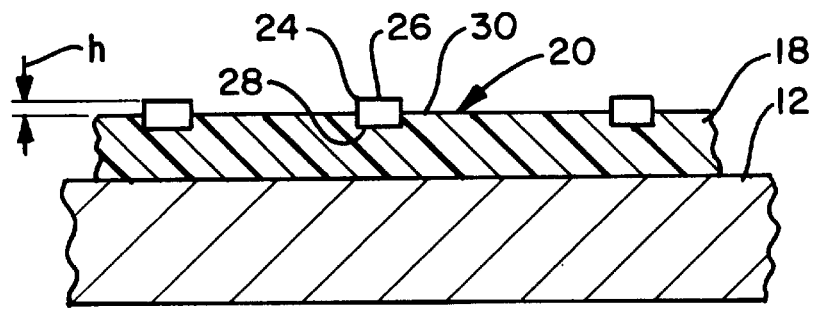
FIG. 3 is an enlarged view of the adhesive layer shown in FIG. 2, with the discrete barrier structure as shown on the surface according to the preferred embodiment of the invention.

FIG. 3 shows the exposed surface 20 as carrying a multiplicity of discrete barrier structures 24, which are spaced apart for reasons to be discussed more fully below. Preferably, the structures are in the form of discrete, minute units, which resemble the ink dot pattern in newspaper or other ink printed photographs. Each dot 24 has an exposed upper surface or top end 26 which is free of any tackiness, i.e., the surface 20 has no adhesive thereon. The lower surface or bottom end 28 of each dot 24, can be on or slightly embedded within the substantially flat exposed adhesive surface 30. Under either condition, each dot 24 projects from the nominal adhesive surface 30, by a distance "h" in the range of about 0.00025–0.00050 inch (0.25 to 0.50 mils). Therefore, the length of each dot in the direction "h", is at least about 0.00025 inch.

The barrier structure such as dots 24 preferably have a flat upper surface 26, rather than a sharp or highly curved surface. The barrier structure should occupy 10–30%, preferably about 20%, of the total area of surface 20 of the adhesive layer 18. This can be achieved with the preferred dot structure, by using screen printing or analogous techniques in the range of about 40–60 lines per inch.

Figure 4:
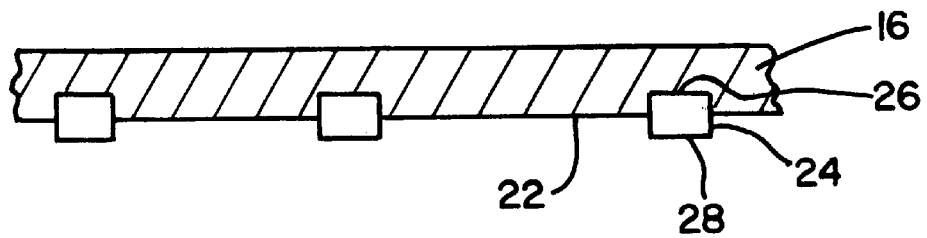
FIG. 4 is an enlarged view of the release sheet portion of the adhesive system of FIG. 1, before the discrete barrier structures have been transferred to the adhesive layer.
Figure 6:
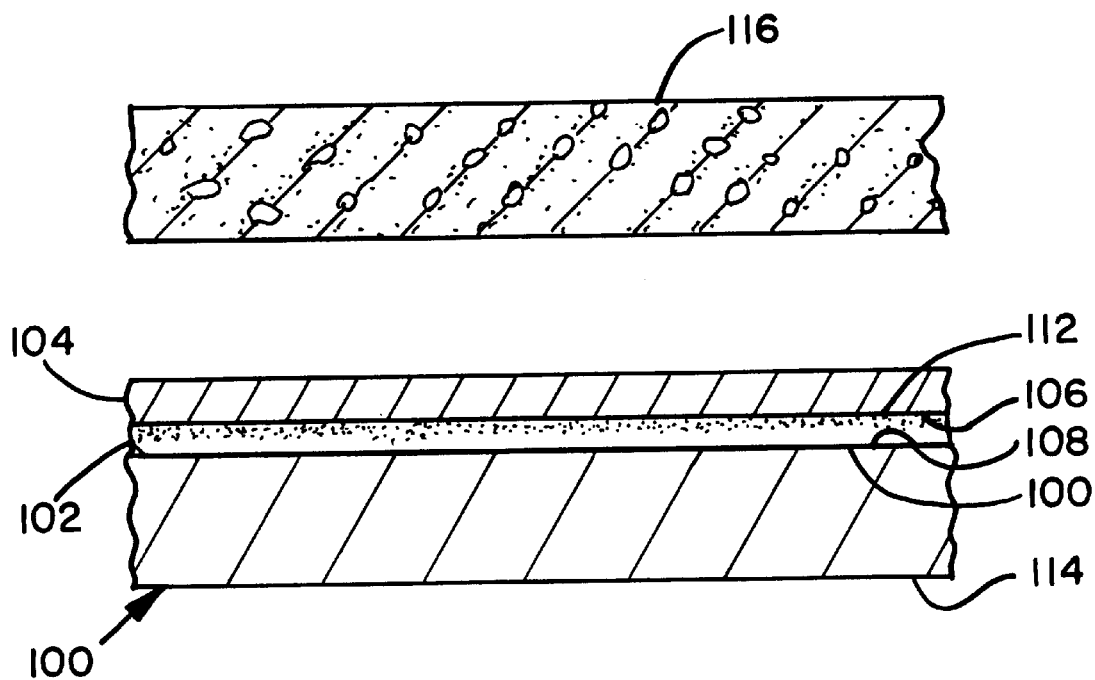
FIG. 6 is a schematic view, partly in section, of a decorative sheet material which carries an adhesive system by which the sheet material can be secured to a floor or wall.

One technique for producing the configuration of dots 24 as shown in FIG. 3, can be implemented by first printing, nipping, or otherwise depositing the dots onto the underside 22 of the carrier sheet 16 before the sheet 16 is laminated as by nip rolls, with adhesive material constituting layer 18. Layer 18 could be carried by a tape release liner (not shown), or it could have been previously applied as by coating on the framing board 12 (or graphics sheet as shown in FIG. 6). Preferably, the adhesive 18 is not coated onto the dots. The carrier sheet 16 can be printed for example, by rotary screen with an ink having high solids content, to produce the configuration shown in FIG. 4. Because the release liner or sheet 16 is of a conventional type which has release properties, the top surface 26 of each dot 24 is only tenuously adhered to sheet 16. In contrast, the bottom surface 28 of each dot will adhere aggressively to the adhesive material at 30 on the layer 18, when the layers 16 and 18 are laminated or otherwise formed together to produce, e.g., a tape. Thus, as may be appreciated with reference to FIGS. 1–3, upon peeling away of liner 16 from adhesive layer 18, the dots 24 transfer from liner 16 as shown in FIG. 4, to layer 18 as shown in FIG. 3.

When the active surface 20 adhesive layer 18 is exposed as shown in FIGS. 2 and 3, the photograph 10 can be placed on the adhesive layer 18, whereby the lower surface 32 of item 10 rests on the barrier structure 24. In particular, the underside 32 of item 10 can slide on the upper surfaces 26 of the barrier structure, to achieve "non-tack" repositioning and alignment of the item 10 relative to the substrate 12. It should be appreciated that, typically, the user can secure the adhesive system 14 to the substrate 12 without exercising great care, because the area of the adhesive system 14 should be smaller than that of the item 10. Therefore, any misalignment of the adhesive system will be covered and hidden by the item 10. Whereas conventionally, significant problems or inconveniences have burdened the user in trying to achieve precise alignment of the item 10 relative to substrate 12, the freedom afforded by the present invention to slide and reposition the item while the item rests on the adhesive layer 18, represents a major advance in the state of the art.

Figure 5:
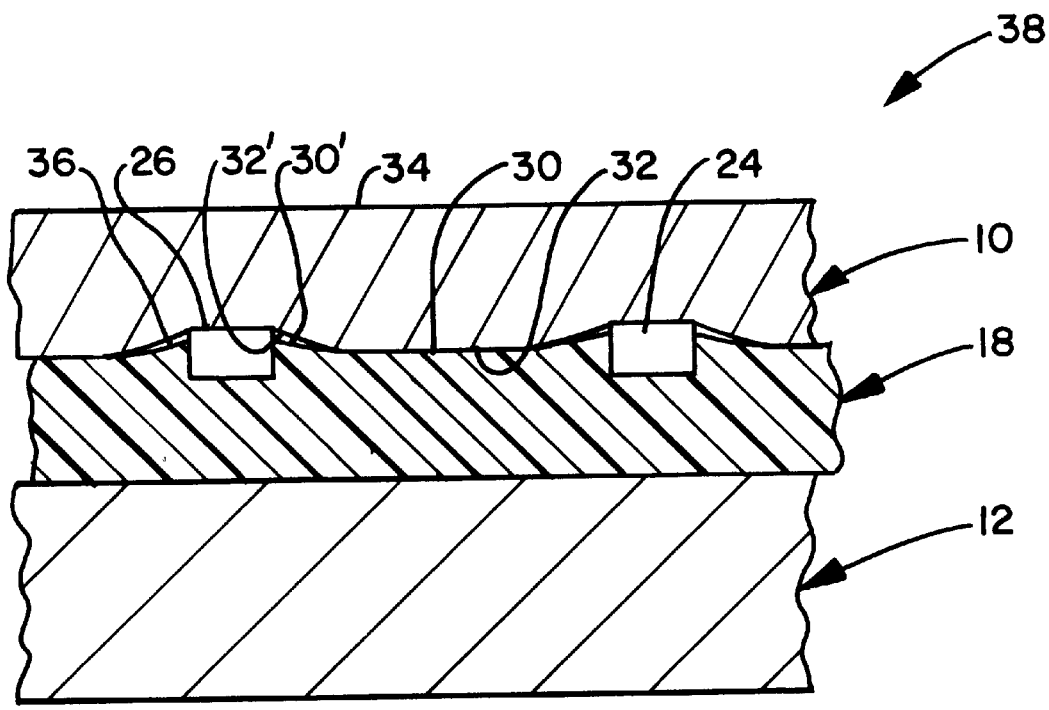
FIG. 5 is an enlarged view of the completed graphic system, showing the nature of the bonded interface between the photograph and the adhesive layer.

Once the user has properly aligned the item on the adhesive layer 18, the user presses on the item with, for example, casual finger pressure, thereby tacking the item in place. Thereafter, substantially all of the surface 32 of item 10 is bonded to surface 30 of adhesive layer 18 by using a roller, squeegee, vacuum press, or other application of pressure over the entire viewable surface 34 of item 10. The resulting bonded interface is shown in FIG. 5. The application of bonding pressure may cause the barrier structure to recede somewhat into the adhesive layer 18, while at the same time the adhesive material 30' adjacent the barrier structure 24, wets out to provide attachment to the portion 32' of the item 10, thereby reducing substantially the gap 36 which was perhaps created during the initial tacking after satisfactory alignment of the item.

The projecting barrier structure not only permits sliding of the item 10 relative to the adhesive layer 18, but also permits the escape of air from between item 10 and surface 20, as the user draws a squeegee or similar edge tool across surface 34 of item 10 to effectuate the uniform and permanent bond between surface 32 and surface 30. Furthermore, the pressure applied by the edge tool or the like, is imposed on relatively flat surfaces 26 of the barrier structure, thereby avoiding localized grainy patterns often accompanying the use of semi-tacky adhesive systems containing, for example, microspheres. Moreover, most known adhesive systems of this type have the microspheres distributed either uniformly or preferentially toward the surface of the adhesive layer, but the microspheres are usually submerged and therefore covered by adhesive material. Even if such microspheres project from the nominal surface level of the adhesive layer, thereby reducing the area of the item which contacts adhesive material in the layer, some tackiness is still present and prevents the sliding advantage achievable with the present invention. Thus, the present invention achieves the combination of sliding alignment, exhaust of trapped air, and avoidance of gritty surface irregularities. This combination is not possible with any currently known pressure sensitive adhesive systems in the field of graphics.

Of course, the user of the inventive adhesive system expects that the item 10 will remain securely bonded to the substrate 20 indefinitely, producing a graphic system 38 observable as a permanent mounting of the item 10 on the mounting substrate 12. Another advantage of the present invention, is that an aggressive adhesive material can be utilized while still achieving the sliding alignment capability. Preferably, a conventional pressure sensitive acrylic adhesive is used, at a thickness in the range of 1.0–2.0 mils, preferably about 1.5 mils. Despite the initial isolation of the item 10 from the adhesive surface 30 due to coverage by the barrier structure 24, the effect of the barrier structure receding into the adhesive and/or the adhesive moving outwardly along the sides of the barrier structure after full surface pressure has been applied, as represented at 30' in FIG. 5, assures that enough contact is maintained at the interface between items 10 and layer 18, to achieve long-lasting, secure bonding.

Based on the foregoing description, one of ordinary skill in the graphics field, can optimize the inventive pressure activated adhesive system according to the particular end use. For example, when a relatively thick item 10 is to be mounted, an important objective is achieving permanent bonding despite the significant weight of the item. On the other hand, if one intends to mount a thin metallic foil to a substrate, an important objective might be avoidance of air bubbles and any grainy or gritty surface irregularities due to the presence of the underlying barrier structures. Variables which are available to optimize the invention include the configuration of the barrier structure, the extent of surface area occupied by the barrier structure, the projection height of the barrier structure from the nominal surface of the adhesive layer, and the composition and color of the barrier structure. If the density and/or height "h" of the dots are too large, the permanent bond effectiveness will be undermined. If the density and/or height are too small, the "non-tacky" sliding for alignment will be undermined.

As a particular example, a dot pattern printed at 55 lines per inch according to conventional standards of photographic rendition, would result in a center-to-center distance between adjacent dots, of about 0.020 inch, and a distance between edges of adjacent dots, of about 0.012 inch. The dots would cover about 20–30 percent of the total surface area.

Another optimization regarding the composition of the barrier structure, includes the use of a release ink, such as silicone ink, if one wanted to minimize the possibility that the adhesive material at 30' might "crawl-up" the sides of the barrier structure and thereby reach the upper surface 26 on which no adhesive should be present. Another advantage of the present invention, is that only the barrier material, i.e., the dots, project above the nominal surface of the adhesive layer. This also avoids the possibility that (for example due to low surface tension) adhesive material immediately beneath the dots might extrude around the dots during handling and thereby contaminate the upper surface of the dots.

The barrier structure can include materials chosen primarily for convenience in distribution onto the adhesive surface. In the embodiment illustrated in FIGS. 1, 2, and 3, the dots 24 were printed onto the release sheet or liner 16, and thereafter transferred onto the pressure sensitive layer 18. Alternatively, the mounting board 12 or other substrate could have been first coated or laminated with an adhesive and thereafter the release liner, with printed barrier structure down, placed thereon. The release liner would cover the substrate and the adhesive coating, until the user was ready to mount an item thereon, at which time the user would peel away the release liner.

As is known with conventional pressure sensitive adhesive systems, the present invention can be implemented in the context of either single sided or double sided tape. The invention could alternatively be in the form of a laminate sold in rolls for covering a poster board or other mounting board.

As shown in FIG. 6, a decorative sheet material 100 (or mounting board) could be coated with adhesive 102 and a liner 104 having the barrier structure 106, nip rolled against the adhesive coating on the back side 108 of the decorative sheet or board. One can readily appreciate that the configuration shown in FIG. 6 could be applied to a wall or floor 116, after the release liner 104 is removed. In this embodiment, the decorative sheet has a back side 108 laminated to the side 110 of the adhesive layer 102 which is opposite the side 112 of the adhesive layer 102 which carries the dots 106. The other side 114 of the decorative sheet, exhibits or is covered by, a graphic pattern or design.

Although the barrier structure has been described in the preferred form of discrete, spaced-apart structures such as dots, other formations such as chevrons or herringbones, if properly spaced apart, can also be utilized for some applications.

What is claimed is:

1. A method for making a pressure-activated adhesive surface, comprising:

selecting a substrate which carries an adhesive layer defining a nominally flat pressure sensitive adhesive surface;

transferring a multiplicity of distinct hard barrier structures from a release liner onto said adhesive layer in spaced apart relation, whereby each of said structures when deposited has a bottom portion which adheres to and is embedded in the adhesive layer below said nominally flat adhesive surface and a nominally flat top surface which projects from said nominally flat adhesive surface a distance in the range of 0.00025–0.0005 inch.

2. The method of claim 1, wherein the step of transferring covers about 10–30% of the pressure sensitive adhesive surface.

3. The method of claim 1, comprising the steps of coating said substrate with an adhesive material to form said adhesive layer, before transferring the barrier structure from a release liner to said adhesive layer.

4. The method of claim 1, wherein said adhesive is an acrylic adhesive.

5. The method of claim 1, comprising the steps of
   selecting a tape having a release liner with said barrier structure retained on said release liner and an adhesive material covering said barrier structure;
   adhering the adhesive material to said substrate to form said adhesive layer; and
   peeling the release liner away from the adhesive layer whereby said barrier structure is deposited by transfer to the surface of the adhesive layer.

6. A pressure activated adhesive system comprising:
   a pressure sensitive adhesive layer having a nominal thickness and at least one side having a nominally flat active surface;
   a multiplicity of discrete hard barrier structures on the active surface of said adhesive layer, each of said structures having a length of at least 0.00025 inch which projects from the active surface a distance in the range of about 0.00025–0.0005 inch, said barrier structures in the aggregate, occupying about 10–30 percent of the area of said one side of the adhesive layer.

7. The adhesive system of claim 6, wherein the barrier structures respectively consist essentially of a multiplicity of minute units distributed substantially uniformly on said active surface.

8. The adhesive system of claim 7, wherein the minute units are in the form of substantially uniform dots on said active surface at a density in the range of 40–60 line dot screen.

9. The adhesive system of claim 7, wherein the minute units are composed primarily of high solids content ink.

10. The adhesive system of claim 7, wherein the minute units each have a top surface opposite said active surface, which is nominally flat.

11. The adhesive system of claim 10, wherein the minute units have a bottom end which is imbedded below the active surface of the adhesive layer.

12. The adhesive system of claim 6, wherein the adhesive layer has another side which is bonded to a substantially flat, relatively rigid graphics framing board and the minute units on the active surface are covered by release material.

13. The adhesive system of claim 6, wherein the adhesive layer has another side which is bonded to sheet material and the minute units on the active surface of the adhesive layer are covered by release material.

14. The adhesive system of claim 13, wherein the sheet material has one side bonded to the adhesive layer and another side covered with graphics.

15. A pressure activated tape or roll system comprising:
    a release liner having outer and inner surfaces;
    an adhesive layer having a pressure sensitive surface confronting the inner surface of the release liner;
    a multiplicity of discrete hard material units each having a nominally flat surface in direct contact with and releasable from the inner surface of the release liner and a substantially opposite surface permanently adhered to said pressure sensitive surface, each of said units having a length dimension extending at least about 0.00025 inch from the pressure sensitive surface of the adhesive layer toward the release liner.

16. The system of claim 15, wherein the units occupy about 10–30% of the pressure sensitive surface.

17. The system of claim 16, wherein the units project from the pressure sensitive surface by a distance in the range of about 0.00025 inch to 0.00050 inch.

* * * * *